United States Patent
Gao et al.

(10) Patent No.: US 12,118,572 B2
(45) Date of Patent: Oct. 15, 2024

(54) DYNAMIC CARBON SINK MEASUREMENT METHOD FOR AFFORESTATION CARBON SINK AND FOREST MANAGEMENT CARBON SINK PROJECTS

(71) Applicants: Sichuan Provincial Institute of Forestry and Grassland Inventory and Planning, Sichuan (CN); Sichuan Forestry Survey, Design and Research Institute Co., Ltd, Sichuan (CN); Chengdu Academy of Agriculture and Forestry Sciences, Sichuan (CN)

(72) Inventors: Fei Gao, Sichuan (CN); Yongjun Wang, Sichuan (CN); Nana Li, Sichuan (CN); Yingze Tian, Sichuan (CN); Changhong Lai, Sichuan (CN); Fang Song, Sichuan (CN)

(73) Assignees: Sichuan Provincial Institute of Forestry and Grassland Inventory and Planning, Chengdu (CN); Sichuan Forestry Survey, Design and Research Institute Co., Ltd, Chengdu (CN); Chengdu Academy of Agriculture and Forestry Sciences, Chengdu (CN)

( * ) Notice: Subject to any disclaimer, the term of this patent is extended or adjusted under 35 U.S.C. 154(b) by 0 days.

(21) Appl. No.: 18/593,966

(22) Filed: Mar. 3, 2024

(65) Prior Publication Data
US 2024/0303671 A1    Sep. 12, 2024

(30) Foreign Application Priority Data
Mar. 6, 2023   (CN) .......................... 202310203619.1

(51) Int. Cl.
*G06Q 30/018*   (2023.01)
*B01D 53/14*   (2006.01)
*G06Q 10/10*   (2023.01)

(52) U.S. Cl.
CPC ....... *G06Q 30/018* (2013.01); *B01D 53/1475* (2013.01); *G06Q 10/103* (2013.01)

(58) Field of Classification Search
CPC . G06Q 30/018; G06Q 10/103; B01D 53/1475
See application file for complete search history.

(56) References Cited

U.S. PATENT DOCUMENTS

| | | | |
|---|---|---|---|
| 11,531,387 B1* | 12/2022 | Citron | ................ G06Q 30/0201 |
| 2020/0027096 A1* | 1/2020 | Cooner | ................ G06Q 40/04 |

(Continued)

FOREIGN PATENT DOCUMENTS

| | | | |
|---|---|---|---|
| CN | 105225160 A | 1/2016 | |
| CN | 106022652 A | 10/2016 | |

(Continued)

OTHER PUBLICATIONS

1st Office Action of counterpart Chinese Patent Application No. 202310203619.1 issued on May 8, 2023.

(Continued)

*Primary Examiner* — Ricky Go

(57) ABSTRACT

The present invention relates to a dynamic carbon sink measurement method for afforestation carbon sink and forest management carbon sink projects, comprising: (1) monitoring the project boundary; (2) monitoring the baseline IoT; (3) monitoring the project IoT; (4) monitoring the real-time total carbon stock and carbon change; (5) determining the monitoring end and monitoring the automatic period. The invention dynamically obtains the baseline and project carbon density by deploying carbon layer carbon density IoT monitoring sample plots. Combining the division and area (Continued)

computation of baseline carbon layers, remote sensing monitoring of project carbon layer changes, the invention dynamically updates the project carbon layer area, dynamically and periodically obtains the baseline and project carbon layer total carbon stock, the total carbon stock and the carbon change within the project boundary, which significantly improves monitoring timeliness and precision for projects, while reducing monitoring costs, making it suitable for large-scale promotion and application.

8 Claims, 4 Drawing Sheets

(56) References Cited

U.S. PATENT DOCUMENTS

| | | | |
|---|---|---|---|
| 2022/0276625 A1* | 9/2022 | Metzger | G05B 15/02 |
| 2022/0374912 A1 | 11/2022 | Zeng | |
| 2024/0020708 A1* | 1/2024 | Rivera | G01N 33/24 |

FOREIGN PATENT DOCUMENTS

| | | |
|---|---|---|
| CN | 110245420 A | 9/2019 |
| CN | 112819280 A | 5/2021 |
| CN | 113735396 A | 12/2021 |
| CN | 114358995 A | 4/2022 |
| CN | 114817616 A | 7/2022 |
| CN | 114841625 A | 8/2022 |
| CN | 114894254 A | 8/2022 |
| CN | 114993977 A | 9/2022 |
| CN | 115545254 A | 12/2022 |
| WO | 2023024794 A1 | 3/2023 |

OTHER PUBLICATIONS

Notice of Allowance of counterpart Chinese Patent Application No. 202310203619.1 issued on May 18, 2023.

* cited by examiner

DYNAMIC CARBON SINK MEASUREMENT METHOD FOR AFFORESTATION CARBON SINK AND FOREST MANAGEMENT CARBON SINK PROJECTS

CROSS REFERENCE TO RELATED APPLICATIONS

The present application claims the benefit of Chinese Patent Application No. 202310203619.1 filed on Mar. 6, 2023, the contents of which are incorporated herein by reference in their entirety.

TECHNICAL FIELD

The present invention relates to the field of IoT, geospatial data collection, computation, and processing, specifically to a dynamic carbon sink measurement method for afforestation carbon sink and forest management carbon sink projects.

BACKGROUND

Carbon sink afforestation and forest management carbon sink projects are project activities that aim to increase forest carbon sink and activities that measure and monitor carbon sink throughout the entire process of afforestation and forest management activities. Currently, there are two types of carbon sink measurement methods: one involves surveying biomass to compute carbon stock, and the other utilizes micro-meteorological principles to measure forest carbon dioxide carbon flux. The method that uses the monitoring of biomass to compute carbon stock changes is applied to measure and monitor carbon sink afforestation and forest management carbon sink projects. It is recommended to use sample plot survey to monitor above-ground biomass. The monitoring frequency for fixed sample plots is recommended to be once every 3-10 years. During the measurement of each tree in fixed sample plots, the diameter at breast height (DBH) and/or tree height of all standing trees should be measured.

Currently, the plot survey method is mainly used in the above-ground biomass monitoring, which involves manually setting up and measuring the perimeter of the sample plot, conducting a survey of each sample tree within the perimeter of the plot. Both quality check and continuous monitoring require investigators to arrive at the plot again and repeat the measurement process, resulting in the following drawbacks:

high monitoring cost and low measurement accuracy: the establishment, quality check and monitoring of the sample plot all require professional investigators to repeatedly measure the sample trees within the fixed sample plot, resulting in high monitoring costs. Measurement errors, data entry errors, and operational errors can easily lead to inaccurate data.

poor monitoring timeliness, inability to dynamically reflect carbon stock changes: due to the large workload and high costs of surveying and monitoring, the recommended monitoring frequency for fixed sample plots is once every 3-10 years, making it difficult to accurately grasp the detailed tree growth dynamics and resulting in poor monitoring timeliness.

In view of the above, there is an urgent need to provide a dynamic carbon sink measurement method for afforestation carbon sink and forest management carbon sink projects that can significantly improve the timeliness and precision of the monitoring, reduces the monitoring costs, and is suitable for large-scale promotion and application.

SUMMARY

The object of the present invention is to provide a dynamic carbon sink measurement method for afforestation carbon sink and forest management carbon sink projects that can significantly improve the timeliness and precision of the monitoring, reduces the monitoring costs, and is suitable for large-scale promotion and application.

The above purpose is achieved through the following technical scheme:

A dynamic carbon sink measurement method for afforestation carbon sink and forest management carbon sink projects, comprising the following steps:

(1) monitoring the project boundary: determining the project boundary;

(2) monitoring the baseline IoT:

(2.1) dividing the baseline carbon layers and computing the area;

(2.2) baseline carbon layer carbon density IoT monitoring: designing and deploying the baseline IoT sample plots, dynamically monitoring the arbor per unit area, the deadwood per unit area, and the litter per unit area in the baseline carbon layers, and computing the baseline carbon layer carbon density: (a) after measuring the perimeter of the sample plots, fixing a tree diameter measurement sensor at the breast height position of each sample tree in a zigzag route, recording the tree species and tree type information of the sample tree, and fixing a communication gateway in the center of the sample plots;

(b) after the communication gateway obtains the data collected by each tree diameter measurement sensor and synchronizes the clock with each tree diameter measurement sensor, the communication gateway transmits the stored information back to the server through a mobile communication network or Beidou short message, and disconnects the connection with the tree diameter measurement sensor after successful transmission, and then enters a sleep state;

(c) the tree diameter measurement sensor automatically enters a sleep state when there is no connection with the communication gateway;

(d) the communication gateway and the tree diameter measurement sensor automatically wake up at the set wake-up time, wake-up duration, and wake-up frequency, completing steps (b) and (c) until the end of the monitoring cycle;

(2.3) computing the baseline carbon layer total carbon stock: by multiplying the baseline carbon layer carbon density by the area of each carbon layer patch, obtaining the baseline carbon layer total carbon stock;

(3) monitoring the project IoT:

(3.1) dividing the project carbon layers: within the project boundary, dividing the project carbon layers according to the project activity types;

(3.2) monitoring remote sensing change of the project carbon layers: conducting the change detection of remote sensing images for two periods, updating the project carbon layer patches and generating the changes of the patches through the interpretation, verification, and validation of the changed patches, obtaining the current status database and change database of the project carbon sinks, and the latest carbon layer patch area for total processing measurement of the project carbon layers, wherein the layout method and process of the project IoT sample plot monitoring are consistent with the baseline IoT sample plot monitoring;

(3.3) project carbon layer carbon density IoT monitoring: designing and deploying the IoT sample plots for the project according to the project carbon layers adjusted by the remote sensing change monitoring, dynamically monitoring the arbor of the forest per unit area, the deadwood per unit area, the litter per unit area in the project carbon layers, and the greenhouse gas emissions of the project, and computing the baseline carbon layer carbon density;

(3.4) computing the project carbon layer total carbon stock: by multiplying the project carbon layer carbon density by the area of each carbon layer patch, obtaining the project carbon layer total carbon stock;

(4) monitoring total carbon stock and carbon change in real time: computing the total carbon stock for the current monitoring cycle within the project boundary, as well as the carbon change rate per unit time;

(5) determining the end of monitoring and monitoring the automatic period: running and monitoring periodically according to the set time of the IoT monitoring sample plots; ending the monitoring if the monitoring of the project boundary, baseline, and project activities all ceases and results in the withdrawal of the project.

In a further technical solution, the specific steps in step (2.2) are as follows:

(2.2.1) designing the baseline sample plots: based on the project scope and precision requirements, selecting a sample plot layout scheme, determining the number and size of the baseline sample plots;

(2.2.2) monitoring the baseline IoT sample plots: according to the designated sample plots, fixing tree diameter measurement sensors at the breast height position of sample trees in baseline sample plots, connecting the tree diameter measurement sensors to the communication gateway so that the sensors can monitor and collect data on the diameter at breast height and the growth status of the sample trees, and transmitting the data back to the server through communication to realize the monitoring of various carbon pools in the plots;

(2.2.3) computing the baseline arbor carbon density: computing the baseline arbor carbon density by using the biomass expansion factor method;

(2.2.4) computing the baseline deadwood carbon density: based on the computation results in step (2.2.3), the "carbon stock change method" combined with the "default value method" is used to compute the baseline deadwood carbon density;

(2.2.5) computing the baseline litter carbon density: based on the computation results in step (2.2.3), the "carbon stock change method" combined with the "default value method" is used to compute the baseline litter carbon density;

(2.2.6) computing the baseline carbon layer carbon density: summing up the carbon stock of biomass, dead wood, and litter of all tree species.

In a further technical solution, the specific steps in step (2.2.3) are as follows:

(2.2.3.1) according to the data of the sample tree species, the diameter at breast height, and the standing tree type from the sample plots collected in the IoT sample plots in step (2.2.2), the volume of standing trees for each tree species per unit area is computed by using the unified single entry volume table in this area, with diameter as the independent variable and volume as the dependent variable, where a computation formula is as follows:

$$v_{base,i,j,t} = \frac{\sum_{j=1}\sum_{k=1} f_j(d_{k,i,j,t})}{s}$$

where $v_{base,i,j,t}$ is the volume of standing trees per unit area in the baseline for tree species j in the i-th carbon layer at the t-th monitoring; $d_{k,i,j,t}$ is the DBH of k-th sample tree for tree species j in the i-th carbon layer at the t-th monitoring; s is the area of the sample plot; $f_j$ is the empirical equation for the single entry volume of this tree species j; j is the tree species j; k is the k-th sample tree; t is the t-th monitoring; i is the i-th carbon layer;

(2.2.3.2) computing biomass by using the biomass expansion factor method, with volume as the independent variable and biomass as the dependent variable; obtaining three default values for wood density, root-to-crown ratio, and biomass expansion factor from tables, where a computation formula is as follows:

$$w_{base,i,j,t} = v_{base,i,j,t} \times WD_j \times BEF_j \times (1+R_j)$$

where $v_{base,i,j,t}$ is the baseline biomass per unit area for tree species j in the i-th carbon layer at the t-th monitoring; $WD_j$ is the density of standing trees of tree species j; $BEF_j$ is a dimensionless biomass expansion factor that converts the trunk biomass of standing trees of tree species j into above-ground biomass; $R_j$ is the root-to-crown ratio of standing trees of tree species j;

(2.2.3.3) computing carbon stock by using the carbon content of biomass to convert biomass into carbon stock; converting carbon stock to carbon dioxide equivalent by using the ratio of carbon dioxide analysis to the molecular weight of carbon, where a computation formula is as follows:

$$c_{tree\_base,i,j,t} = \frac{44}{12} \times w_{base,i,j,t} \times CF_j$$

where $c_{tree\_base,i,j,t}$ is the baseline arbor carbon density for tree species j in the i-th carbon layer at the t-th monitoring; $CF_j$ is the carbon content of standing trees of tree species j;

where a computation formula in step (2.2.4) is as follows:

$$c_{dw\_base,i,j,t} = c_{tree\_base,i,j,t} \times DF_j$$

where $cc_{dw\_base,i,j,t}$ is the baseline dead wood carbon density for tree species j in the i-th carbon layer at the t-th monitoring; $DF_j$ is the ratio of the baseline dead wood carbon content to the baseline arbor carbon stock for tree species j, which is the default value;

where a computation formula in step (2.2.5) is as follows:

$$c_{li\_base,i,j,t} = f_j(w_j) \times c_{tree\_base,i,j,t}$$

where $c_{li\_base,i,j,t}$ is the baseline litter carbon density for tree species j in the i-th carbon layer at the t-th monitoring; $f_j(w_j)$ is the correlational relationship between the baseline litter biomass and the baseline arbor biomass for tree species j, which is the default value;

where a computation formular in step (2.2.6) is as follows:

$$c_{base,i,t} = \sum_{j=1}(c_{tree\_base,i,j,t} + c_{dw\_base,i,j,t} + c_{li\_base,i,j,t})$$

where $c_{base,t}$ is the baseline carbon layer carbon density in the i-th carbon layer at the t-th monitoring.

In a further technical solution, a computation formula in step (2.3) is as follows:

$$c_{base,t} = \sum_{i=1}(c_{base,i,t} \times s_{base,i})$$

where $c_{base,t}$ is the baseline carbon layer total carbon stock at the t-th monitoring; $s_{base,i,t}$ is the area of the baseline carbon layer patches in the i-th carbon layer.

In a further technical solution, the specific steps in step (3.2) are as follows:

(3.2.1) after pre-processing the updated remote sensing images, obtaining the patches with changes in land type within the monitoring area; determining the patch numbers, boundary, and area of the changed patches, initially judging the cause of the changes; performing quality check to ensure that there are no overlapping or fragmented patches;

(3.2.2) collecting archive materials, using data verification methods to confirm the current land class, the reasons for changes, current forest stand factors, management factors, and the project activity factors indoors for the changed patches supported by archive materials; for the changed patches without archive materials support, conducting field investigation methods to confirm the current land class, the reasons for changes, current forest stand factors, management factors, and the project activity factors, refining and filling in the investigation factors for patches with inconsistencies in important factors such as land class and the reasons for changes, forming investigation factors and filling in the remote sensing change patch database with correct attribute logic based on the results of indoor and field investigations;

(3.2.3) using the remote sensing change patch database to update the graphics and attributes in the previous carbon layer pattern database, performing attribute logic and spatial topology quality check on the updated results to ensure logical correctness and no overlapping, gaps, or multi-component topology errors, using GIS software to recompute the area of each carbon layer patch to create a project carbon layer database of the current state, and obtaining the latest carbon layer patch area used for the overall processing and quantification of project carbon layers;

(3.2.4) performing spatial union by using the previous carbon layer patch database and the project carbon layer database of the current state, adding attribute factors such as the reasons for changes, change basis, and change time, improving and filling in attribute factors according to the attribute quality check logic of the change database, creating the project carbon layer change database.

In a further technical solution, the specific steps in step (3.3) are as follows:

(3.3.1) designing the project sample plots: based on the project scope and precision requirements, selecting a project sample plot layout scheme, determining the number and size of the project sample plots, wherein the size of the project sample plots is consistent with that of the baseline sample plots;

(3.3.2) monitoring the project IoT sample plots;

(3.3.3) computing the project arbor carbon density: computing the project arbor carbon density by using the biomass expansion factor method;

(3.3.4) computing the project dead wood carbon density: based on the computation results in step (3.3.3), using the "carbon stock change method" combined with the "default value method" to compute the project dead wood carbon density;

(3.3.5) computing the project litter carbon density: based on the computation results in step (3.3.3), using the "carbon stock change method" combined with the "default value method" to compute the project litter carbon density;

(3.3.6) computing the project greenhouse gas emissions per unit area: the greenhouse gas emissions caused by arbor burning resulting from forest fires within the boundary of comprehensive projects include two parts: arbor and dead organic matter, where a computation formula is as follows:

$$GHG_{current,i,t} = GHG_{tree\_current,i,t} + GHG_{dom\_current,i,t}$$

where $GHG_{current,i,t}$ represents the increase in greenhouse gas emissions in the i-th carbon layer at the t-th monitoring; $GHG_{tree\_current,i,t}$ represents the increase in non-$CO_2$ greenhouse gas emissions caused by arbor burning due to forest fires in the i-th carbon layer at the t-th monitoring; $GHG_{dom\_current,i,t}$ represents the increase in non-$CO_2$ greenhouse gas emissions caused by dead organic matter burning due to forest fires in the i-th carbon layer at the t-th monitoring; the increase in non-$CO_2$ greenhouse gas emissions caused by arbor burning due to forest fires is computed by using the biomass and combustion factors from the previous monitoring, where a computation formula is as follows:

$$GHG_{tree\_current,i,t} = w_{tree\_curent,i,t-1} \times COMF_i \times (EF_{CH_4,i} \times GWP_{CH_4} + EF_{N_2O,i} \times GWP_{N_2O})$$

where $w_{tree\_curent,i,t-1}$ represents the arbor per unit area in the i-th carbon layer at the t−1st monitoring; $COMF_i$ is the combustion index for each vegetation type in the i-th carbon layer, which is a default value; $EF_{CH_4,i}$ is the $CH_4$ emission index in the i-th carbon layer; $GWP_{CH_4}$ is the equivalent that converts $CH_4$ to $CO_2$, defaulting to 25; $EF_{N_2O,i}$ is the $N_2O$ emission index in the i-th carbon layer; $GWP_{N_2O}$ is the equivalent that converts $N_2O$ to $CO_2$, defaulting to 298;

$$GHG_{dom\_current,i,t} = 0.07 \times (c_{dw\_curent,i,t-1} + c_{li\_curent,i,t-1})$$

where $c_{dom\_current,i,t-1}$ is the dead wood biomass per unit area in the i-th carbon layer at the t−1st monitoring; $c_{li\_curent,i,t-1}$ is the litter biomass per unit area in the i-th carbon layer at the t−1st monitoring;

(3.3.7) computing the project carbon layer carbon density: the project carbon layer carbon density is the sum of the arbor carbon stock, the dead wood carbon stock, and the litter carbon stock for all tree species minus greenhouse gas emissions, where a computation formula is as follows:

$$c_{current,i,t} = \sum_{j=1}(c_{tree\_current,i,j,t} + c_{dw\_current,i,j,t} + c_{li\_current,i,j,t}) - GHG_{current,i,t}$$

where $c_{current,i,t}$ is the project carbon layer carbon density in the i-th carbon layer at the t-th monitoring; $c_{base,i,t}$ is the baseline carbon layer carbon density in the i-th carbon layer at the t-th monitoring.

In a further technical solution, a computation formula in step (3.4) is as follows:

$$c_{current,t} = \sum_{i=1}(c_{current,i,t} \times s_{current,i})$$

where $c_{current,t}$ represents the project carbon layer total carbon stock at the t-th monitoring; $s_{current,i,t}$ represents the area of the project carbon layer patches in the i-th carbon layer.

In a further technical solution, the total carbon stock in step (4) is the difference between the project carbon layer total carbon stock and the baseline carbon layer carbon stock, where a computation formula is as follows:

$$c_t = c_{current,t} - c_{base,t}$$

where $c_t$ represents the total carbon stock at the t-th monitoring;

carbon change is the change in carbon stock over a certain monitoring period, computed as follows:

$$\Delta c_{t2,t1} = \frac{c_{t2} - c_{t1}}{t_2 - t_1}$$

where $\Delta c_{t2,t1}$ is the change in carbon stock from the $t_1$-th monitoring to the $t_2$-th monitoring; $c_{t2}$ is the total carbon stock at the $t_2$-th monitoring; $c_{t1}$ is the total carbon stock at the $t_1$-th monitoring. $t_2$ and $t_1$ represent the monitoring period, which is set based on the IoT monitoring sample plots. Compared with the prior art, the present invention has the following advantages:

(1) low monitoring costs and high measurement precision: The monitoring of baseline and project carbon density is completed periodically through IoT sample plots, eliminating the need for repeated surveys. The monitoring work is mainly conducted indoors, greatly reducing monitoring costs. The measurement of the sample tree DBH is automatically completed by tree diameter measurement sensors, avoiding various errors that may occur during manual measurements, improving measurement accuracy, and eliminating data fabrication.

(2) significantly improving the monitoring timeliness, dynamically reflecting changes in carbon stock: The IoT sample plot monitoring in the present invention adopts low-power design, which uses a "once a day, weekly feedback" approach to continuous monitoring for 10 years, significantly improving monitoring timeliness.

As both baseline and project activities are dynamically monitored without linearization processing, the carbon stock changes within the project area can be reflected in real time, showing the dynamic changes in carbon stock with forest structure, season, and climate.

(3) reliable measurement results, strong generalization ability, suitable for large-scale promotion: The method of obtaining carbon density through IoT sample plots in the present invention is consistent with the principles of manual measurement but with higher precision. The method is reliable, and the results are trustworthy. This method can be deployed in real time within the monitoring range accessible to humans. Dynamic monitoring is not constrained by objective environments such as climate and environment, as well as technical methods such as remote sensing quantitative inversion and point cloud data post-processing. The method has strong generalization ability and is suitable for large-scale promotion.

DETAILED DESCRIPTION

Figure 1:
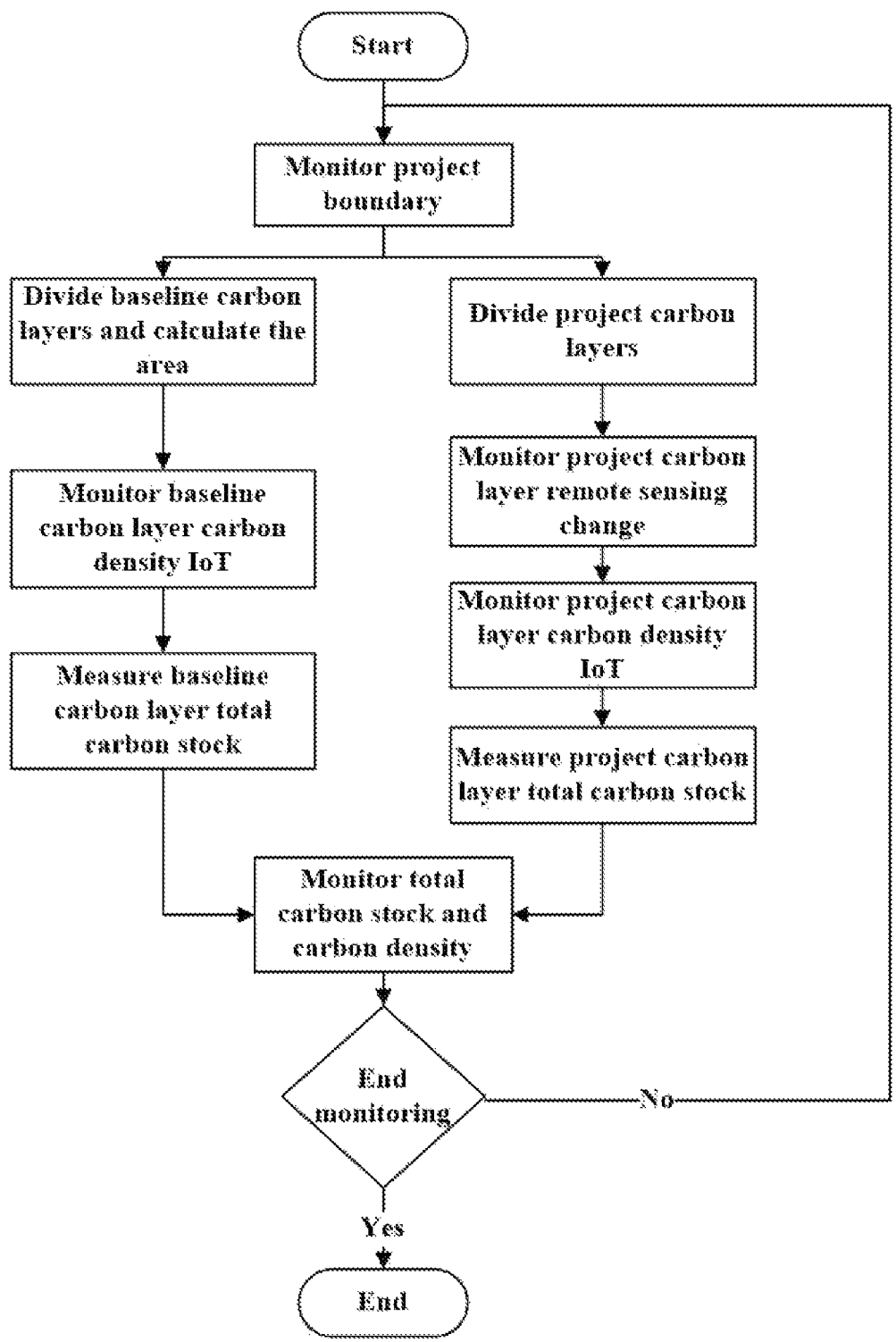
FIG. 1 is a schematic flow chart of a dynamic carbon sink measurement method for afforestation carbon sink and forest management carbon sink projects involved in an implication of the present invention.

The embodiments of the present invention are described in detail below, referring to FIG. 1, a dynamic carbon sink measurement method for afforestation carbon sink and forest management carbon sink projects, comprising the following steps:

(1) monitoring project boundary: according to the afforestation operation design compiled based on carbon sink afforestation and forest management carbon sink projects, referring to the operation design drawing, using GPS, remote sensing, and topographic maps as auxiliary tools; dynamically determining the project boundary based on the actual project boundary;

(2) monitoring baseline IoT:

(2.1) dividing the baseline carbon layer and computing the area: within the project boundary, dividing the baseline carbon layer according to forest stand types before the project implementation; forest stand types include but are not limited to dominant tree species, canopy density, origin, age group, and topography; based on the baseline carbon layer division standards, referring to the operation design drawing, using remote sensing images, and topographic maps as auxiliary tools, the boundary of patches in each baseline carbon layer are delineated, and the area of patches in each baseline carbon layer is computed using GIS software; once the boundary of patches in the baseline carbon layer are defined, they will not change, and the area will remain fixed.

Figure 2:
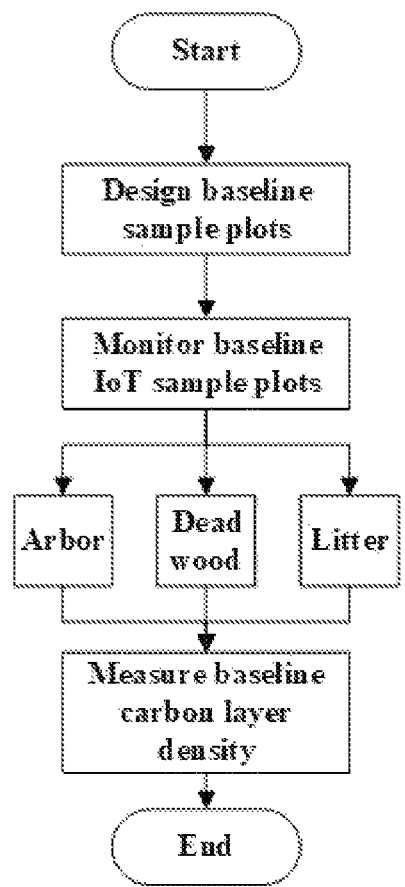
FIG. 2 is a schematic flow chart of the baseline carbon layer carbon density IoT monitoring (CLCDIM) involved in an implication of the present invention.

(2.2) baseline CLCDIM: designing and deploying the baseline IoT sample plots, dynamically monitoring the arbor per unit area, the deadwood per unit area, and the litter per unit area in the baseline carbon layer, and computing the baseline carbon layer carbon density; as shown in FIG. 2, the specific steps are as follows:

(2.2.1) designing the baseline sample plots:

based on the project scope and precision requirements, selecting a sample plot layout scheme and determining the number and size of baseline sample plots;

principles of plot design: For large-scale projects with high precision requirements, a mechanical sampling plan with random starting points and systematic distribution points is adopted. For small-scale projects with low precision requirements, the number of sample plots is allocated based on the size of the carbon layer area. A typical sampling plan is adopted to select representative. The sample plots are evenly distributed within the carbon layer patches.

The number of sample plots is designed as follows:

For mechanical sampling plans, the formula for computing the number of sample plots is as follows:

$$n = \frac{t^2 \times Y^2}{E^2}$$

Where n represents the total number of sample plots within the project boundary; t is the reliability index; Y is the estimated coefficient of arbor carbon stock variation; E is the allowable relative sampling error;

The survey precision requirement is to achieve a sampling precision of 90% at a 90% confidence level.

designing sample plot size: the sample plot area is 0.04-0.06 hectares. In this invention, it is recommended to use a square sample plot with an area of 1 mu, which is 0.0667 hectares.

(2.2.2) monitoring the baseline IoT sample plot: according to the set baseline sample plot, fixing tree diameter measurement sensors at the breast height position of sample trees in the baseline sample plot and connecting the tree diameter measurement sensor to the communication gateway through wireless network; the tree diameter measurement sensor monitors and collects the DBH and growth status of sample trees, and transmits the stored information back to the server through a mobile communication network or Beidou short message; through low-power long-term operation, carbon pool monitoring can be realized in baseline sample plots; the specific steps are as follows: (a) after the perimeter of the baseline sample plots is measured, fixing the tree diameter measurement sensor at the breast height position of each sample tree in a zigzag route and inputting the information about the sample tree species and types, fixing the communication gateway in the center of the baseline sample plots;

(b) after the communication gateway obtains the data collected by each tree diameter measurement sensor and synchronizes the clock with each tree diameter measurement sensor, it transmits the stored information back to the server through a mobile communication network or Beidou short message, and disconnects the connection with the tree diameter measurement sensor after successful transmission, and then enters a sleep state;

(c) the tree diameter measurement sensor automatically enters a sleep state when there is no connection with the communication gateway;

(d) the communication gateway and the tree diameter measurement sensor automatically wake up at the set wake-up time, wake-up duration, and wake-up frequency, completing steps (b) and (c) until the end of the monitoring cycle;

(2.2.3) computing baseline arbor carbon density: computing the baseline arbor carbon density by using the biomass expansion factor method. The specific steps are as follows:

(2.2.3.1) according to the data of the sample tree species, the DBH, and the standing tree type from the baseline sample plots collected in the IoT sample plots in step (2.2.1), using the unified single entry volume table in this area to compute the volume of standing trees for each tree species per unit area, with diameter as the independent variable and volume as the dependent variable, where a computation formula is as follows:

$$v_{base,i,j,t} = \frac{\sum_{j=1}\sum_{k=1} f_j(d_{k,i,j,t})}{s}$$

where $v_{base,i,j,t}$ is the volume of standing trees per unit area in the baseline for tree species j in the i-th carbon layer at the t-th monitoring; $d_{k,i,j,t}$ is the diameter at the breast height position of k-th sample tree for tree species j in the i-th carbon layer at the t-th monitoring; s is the area of the baseline sample plot; $f_j$ is the empirical equation for single entry volume of this tree species j; j is the tree species j; k is the k-th sample tree; t is the t-th monitoring; i is the i-th carbon layer;

(2.2.3.2) computing biomass by using the biomass expansion factor method, with volume as the independent variable and biomass as the dependent variable; obtaining three default values for wood density, root-to-crown ratio, and biomass expansion factor from tables, where a computation formula is as follows:

$$w_{base,i,j,t} = v_{base,i,j,t} \times WD_j \times BEF_j \times (1+R_j)$$

where $v_{base,i,j,t}$ is the baseline biomass per unit area for tree species j in the i-th carbon layer at the t-th monitoring; $WD_j$ is the density of standing trees of tree species j; $BEF_j$ is a dimensionless biomass expansion factor that converts the trunk biomass of standing trees of tree species j into aboveground biomass; $R_j$ is the root-to-crown ratio of standing trees of tree species j;

(2.2.3.3) computing carbon stock by using the carbon content of biomass to convert biomass into carbon stock; converting carbon stock to carbon dioxide equivalent by using the ratio of carbon dioxide analysis to the molecular weight of carbon, where a computation formula is as follows:

$$c_{tree\_base,i,j,t} = \frac{44}{12} \times w_{base,i,j,t} \times CF_j$$

where $c_{tree\_base,i,j,t}$ is the baseline arbor carbon density for tree species j in the i-th carbon layer at the t-th monitoring; $CF_j$ is the carbon content of standing trees of tree species j;

(2.2.4) computing the baseline dead wood carbon density: based on the computation results in step (2.2.3), using the "carbon stock change method" combined with the "default value method" to compute baseline carbon density of dead wood, where a computation formula is as follows:

$$c_{dw\_base,i,j,t} = c_{tree\_base,i,j,t} \times DF_j$$

where $c_{dw\_base,i,j,t}$ is the baseline carbon density of dead wood for tree species j in the i-th carbon layer at the t-th monitoring; $DF_j$ is the ratio of the baseline dead wood carbon content to the baseline arbor carbon stock for tree species j, which is the default value;

(2.2.5) computing the baseline litter carbon density: based on the computation results in step (2.2.3), the "carbon stock change method" combined with the "default value method" is used to compute the baseline litter carbon density, where a computation formula is as follows:

$$c_{li\_base,i,j,t} = f_j(w_j) \times c_{tree\_base,i,j,t}$$

where $c_{li\_base,i,j,t}$ is the baseline litter carbon density for tree species j in the i-th carbon layer at the t-th monitoring; $f_j(w_j)$ is the correlational relationship between the baseline litter biomass and the baseline arbor biomass for tree species j, which is the default value;

(2.2.6) computing the baseline carbon layer carbon density: summing up the carbon stock of arbor, dead wood, and litter of all tree species, where a computation formula is as follows:

$$c_{base,i,t} = \sum_{j=1}(c_{tree\_base,i,j,t} + c_{dw\_base,i,j,t} + c_{li\_base,i,j,t})$$

where $c_{base,i,t}$ is the baseline carbon layer carbon density in the i-th carbon layer at the t-th monitoring.

(2.3) computing the baseline carbon layer total carbon stock: by multiplying the baseline carbon layer carbon density by the area of each carbon layer patch, the baseline carbon layer total carbon stock is obtained, where a computation formula is as follows:

$$c_{base,t} = \sum_{i=1}(c_{base,i,t} \times s_{base,i})$$

where $c_{base,t}$ is the baseline carbon layer total carbon stock at the t-th monitoring; $s_{base,i,t}$ is the area of the baseline carbon layer patches in the i-th carbon layer.

(3) monitoring the project:

(3.1) dividing the project carbon layers: within the project boundary, dividing the project carbon layers according to the project activities types, including afforestation, structural adjustment, tree species replacement, replanting, forest tending, restoration, and comprehensive measures, and further refining these types based on administrative units, ownership, and topography, dynamically adjusting the project carbon layers based on the remote sensing monitoring of carbon layer changes during the dynamic monitoring process, for example, in the event of a forest fire, separately dividing the carbon layer patches in the burned area.

Figure 3:
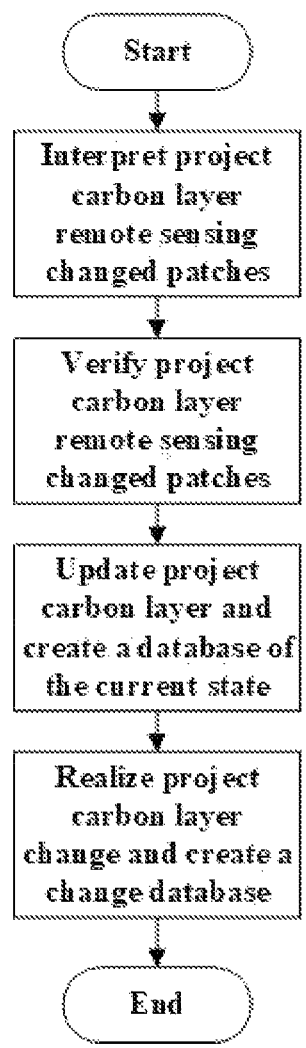
FIG. 3 is a schematic flow chart of remote sensing monitoring of changes in the project carbon layer involved in an implication of the present invention.

(3.2) monitoring remote sensing change of the project carbon layers: when the latest remote sensing images are obtained, conducting the change detection of remote sensing images for two periods, updating the project carbon layer patches and generating the changes of the patches through the interpretation, verification, and validation of the changed patches, obtaining the current status database and change database of the project carbon sinks, and the latest carbon layer patch area for total processing measurement of the project carbon layers. As shown in FIG. 3, the specific steps are as follows:

(3.2.1) after pre-processing the updated remote sensing images, obtaining the patches with changes in land type within the monitoring area, determining the patch numbers, boundary, and area of the changed patches, initially judging the cause of the changes, and performing quality check to ensure that there are no overlapping or fragmented patches;

(3.2.2) collecting archive materials, using data verification methods to confirm the current land class, the reasons for changes, current forest stand factors, management factors, and the project activity factors indoors for the changed patches supported by archive materials; for the changed patches without archive materials support, conducting field investigation methods to confirm the current land class, the reasons for changes, current forest stand factors, management factors, and the project activity factors, refining and filling in the investigation factors for patches with inconsistencies in important factors such as land class and the reasons for changes, forming investigation factors and filling in the remote sensing change patch database with correct attribute logic based on the results of indoor and field investigations;

(3.2.3) using the remote sensing change patch database to update the graphics and attributes in the previous carbon layer pattern database, performing attribute logic and spatial topology quality check on the updated results to ensure logical correctness and no overlapping, gaps, or multi-component topology errors, using GIS software to recompute the area of each carbon layer patch to create a project carbon layer database of the current state, and obtaining the latest carbon layer patch area used for the overall processing and quantification of project carbon layers;

(3.2.4) performing spatial union by using the previous carbon layer patch database and the project carbon layer database of the current state, adding attribute factors such as the reasons for changes, change basis, and change time, improving and filling in attribute factors according to the attribute quality check logic of the change database, and creating the project carbon layer change database.

Figure 4:
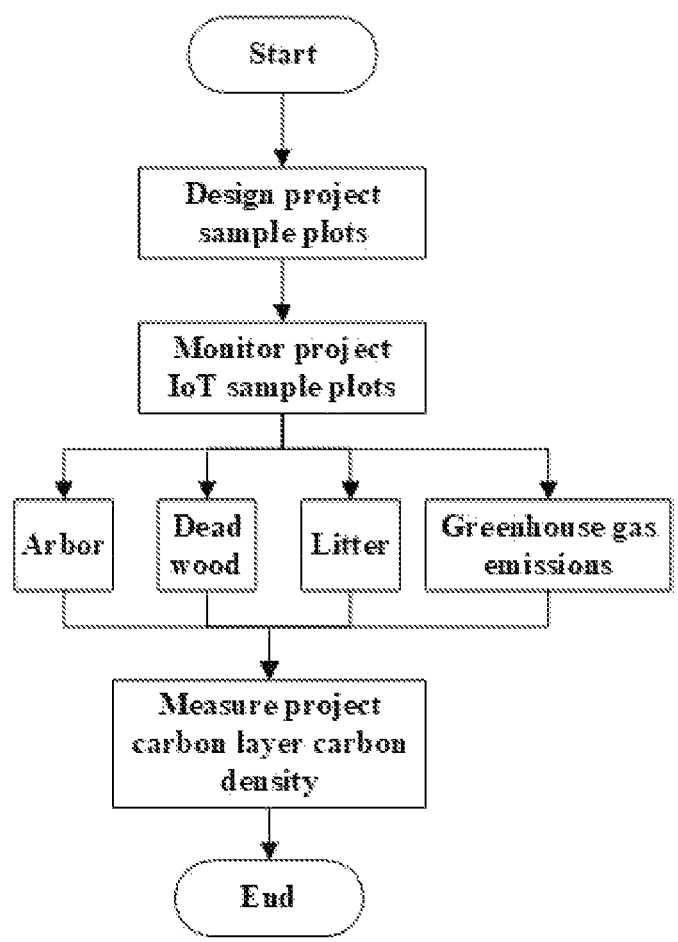
FIG. 4 is a schematic flow chart of the project CLCDIM involved in an implication of the present invention.

(3.3) project carbon layer carbon density IoT monitoring: designing and deploying the IoT sample plots for the project according to the project carbon layers adjusted by the remote sensing change monitoring, dynamically monitoring the arbor of the forest per unit area, the deadwood per unit area, the litter per unit area in the project carbon layers, and the greenhouse gas emissions of the project, and computing baseline carbon layer carbon density. Refer to FIG. 4 for specific steps:

(3.3.1) designing project sample plots: based on the project scope and precision requirements, selecting a project sample plot layout scheme, determining the number and size of the project sample plots, designing and deploying project sample plots according to the same design principles as the baseline and sample plot computation methods, wherein the size of the project sample plots is consistent with that of the baseline sample plots;

(3.3.2) monitoring project IoT sample plots: following the same methods and procedures as the baseline;

(3.3.3) computing project arbor carbon density: the biomass expansion factor method is used to compute the project arbor carbon density; the computation method is the same as the baseline;

(3.3.4) computing the project dead wood carbon density: based on the computation results in step (3.3.3), using the "carbon stock change method" combined with the "default value method" to compute the project dead wood carbon density; the computation method is the same as the baseline;

(3.3.5) computing the project litter carbon density: based on the computation results in step (3.3.3), using the "carbon stock change method" combined with the "default value method" to compute the project litter carbon density; the computation method is the same as the baseline;

(3.3.6) computing the project greenhouse gas emissions per unit area: the greenhouse gas emissions caused by arbor burning resulting from forest fires within the boundary of the comprehensive project include two parts: arbor and dead organic matter, where a computation formula is as follows:

$$GHG_{current,i,t} = GHG_{tree\_current,i,t} + GHG_{dom\_current,i,t}$$

where $GHG_{current,i,t}$ represents the increase in greenhouse gas emissions in the i-th carbon layer at the t-th monitoring; $GHG_{tree\_current,i,t}$ represents the increase in non-$CO_2$ greenhouse gas emissions caused by biomass burning due to forest fires in the i-th carbon layer at the t-th monitoring; $GHG_{dom\_current,i,t}$ represents the increase in non-$CO_2$ greenhouse gas emissions caused by dead organic matter burning due to forest fires in the i-th carbon layer at the t-th monitoring;

The increase in non-$CO_2$ greenhouse gas emissions caused by arbor burning due to forest fires is computed by using the biomass and combustion factors from the previous monitoring, where a computation formula is as follows:

$$GHG_{tree\_current,i,t} = w_{tree\_current,i,t-1} \times COMF_i \times (EF_{CH_4,i} \times GWP_{CH_4} + EF_{N_2O,i} \times GWP_{N_2O})$$

where $w_{tree\_current,i,t-1}$ represents the arbor per unit area in the i-th carbon layer at the t−1st monitoring; $COMF_i$ is the combustion index for each vegetation type in the i-th carbon layer, which is a default value; $EF_{CH_4,i}$ is the $CH_4$ emission index in the i-th carbon layer; $GWP_{CH_4}$ is the equivalent that converts $CH_4$ to $CO_2$, defaulting to 25; $EF_{N_2O,i}$ of is the $N_2O$ emission index in the i-th carbon layer; $GWP_{N_2O}$ is the equivalent that converts $N_2O$ to $CO_2$, defaulting to 298;

$$GHG_{dom\_current,i,t} = 0.07 \times (c_{dw\_curent,i,t-1} + c_{li\_curent,i,t-1})$$

where $c_{dw\_curent,i,t-1}$ is the dead wood biomass per unit area in the i-th carbon layer at the t−1st monitoring; $c_{li\_curent,i,t-1}$ is the litter biomass per unit area in the i-th carbon layer at the t−1st monitoring;

(3.3.7) computing the project carbon layer carbon density: the project carbon layer carbon density is the sum of arbor carbon stock, dead wood carbon stock, and litter carbon stock for all tree species minus greenhouse gas emissions, where a computation formula is as follows:

$$c_{current,i,t} = \sum_{j=1}(c_{tree\_current,i,j,t} + c_{dw\_current,i,j,t} + c_{li\_current,i,j,t}) - GHG_{current,i,t}$$

where $c_{current,i,t}$ is the project carbon layer carbon density in the i-th carbon layer at the t-th monitoring; $c_{base,i,t}$ is the baseline carbon layer carbon density in the i-th carbon layer at the t-th monitoring.

(3.4) computing the project carbon layer total carbon stock: by multiplying the project carbon layer carbon density by the area of each carbon layer patch, the project carbon layer total carbon stock is obtained; where a computation formula is as follows:

$$c_{current,t} = \sum_{i=1}(c_{current,i,t} \times s_{current,i})$$

where $c_{current,t}$ represents the project carbon layer total carbon stock at the t-th monitoring; $s_{current,i,t}$ represents the area of project carbon layer patches in the i-th carbon layer.

(4) monitoring total carbon stock and carbon change: computing the total carbon stock for the current monitoring cycle within the project boundary, as well as the carbon change rate per unit time; the total carbon stock is the difference between the project carbon layer total carbon stock and the baseline carbon layer carbon stock, where a computation formula is as follows:

$$c_t = c_{current,t} - c_{base,t}$$

where $c_t$ represents the total carbon stock at the t-th monitoring;

Carbon change is the change in carbon stock over a certain monitoring period, computed as follows:

$$\Delta c_{t_2,t_1} = \frac{c_{t_2} - c_{t_1}}{t_2 - t_1}$$

where $\Delta c_{t2,t1}$ is the change in carbon stock from the $t_1$-th monitoring to the $t_2$-th monitoring; $c_{t1}$ is the total carbon stock at the $t_2$-th monitoring; $c_{t1}$ is the total carbon stock at the $t_1$-th monitoring. $t_2$ and $t_1$ represent the monitoring period, which is set based on the IoT monitoring sample plots.

(5) determining the end of monitoring and monitoring the period: running and monitoring periodically according to the set time of the IoT monitoring sample plots, ending the monitoring if the monitoring of the project boundary, baseline, and project activities all ceases and results in the withdrawal of the project.

The server adopts a unified timing and sets the same monitoring cycle to the communication gateway of baseline and project carbon layer carbon density IoT sample plots (CLCDISP). Therefore, the wake-up time, wake-up duration, and wake-up frequency of the communication gateway for each tree diameter measurement sensor are also the same, which ensures that the baseline and project activities are synchronized.

In the new monitoring cycle, as the baseline carbon layer and area remain unchanged, the real-time baseline carbon layer carbon density is obtained through the baseline CLCDISP, and the baseline carbon layer total carbon stock for this cycle is computed. To obtain new remote sensing images, the project carbon layer area is updated through remote sensing monitoring of changes in the project carbon layer. The real time project carbon layer carbon density is obtained through the project CLCDISP, and the project carbon layer total carbon stock in this cycle is computed. If no new remote sensing images are obtained, the carbon layer area of the previous project will continue to be used to compute the project carbon layer total carbon stock in this cycle, and finally the total carbon stock and carbon change for this monitoring cycle are obtained.

The present invention addresses the common drawbacks of high monitoring cost, low accuracy, poor timeliness, and weak generalization ability in the carbon sink measurement and monitoring process of carbon sink afforestation and forest management carbon sink projects. The invention provides a dynamic monitoring method for afforestation carbon sink and forest management carbon sink projects. The baseline and project carbon density are dynamically obtained through deploying carbon layer carbon density IoT monitoring sample plots to the baseline and project activities. Combined with the division of baseline carbon layers and area computation, as well as the dynamic updating of the project carbon layer area through the project carbon layer remote sensing change monitoring, the baseline carbon layer total carbon stock, the project layer total carbon stock, total carbon stock and carbon change within the project boundary are dynamically and periodically obtained. which significantly improves the timeliness and precision of the monitoring for afforestation carbon sink and forest management carbon sink projects, while reducing monitoring costs, making it suitable for large-scale promotion and application.

It should be noted that in the carbon sink measurement of the present invention, only the carbon stock and changes of arbor, dead wood, and litter are considered, while the carbon pool of shrubs, soil organic carbon, and wood products is ignored. The carbon sink afforestation and forest management carbon sink project activities of the present invention have no potential leakage and are recognized as 0.

What is claimed is:

1. A dynamic carbon sink measurement method for afforestation carbon sink and forest management carbon sink projects, comprising following steps:
monitoring a project boundary, including: determining the project boundary;
monitoring a baseline IoT, including:
dividing baseline carbon layers and computing an area;
baseline carbon layer carbon density IoT monitoring, including: designing and deploying baseline IoT sample plots, dynamically monitoring an arbor per unit area, a deadwood per unit area, and a litter per unit area in the baseline carbon layers, and computing the baseline carbon layer carbon density:
(a) after measuring a perimeter of the sample plots, fixing a tree diameter measurement sensor at a breast height position of each sample tree in a zigzag route, recording tree species and tree type information of the sample tree, and fixing a communication gateway in a center of the sample plots;
(b) after the communication gateway obtains the data collected by each tree diameter measurement sensor and synchronizes a clock with each tree diameter measurement sensor, the communication gateway transmits stored information back to a server through a mobile communication network or Beidou short message, and disconnects a connection with the tree diameter measurement sensor after successful transmission, and then enters a sleep state;
(c) the tree diameter measurement sensor automatically enters the sleep state when there is no connection with the communication gateway;
(d) the communication gateway and the tree diameter measurement sensor automatically wake up at a set wake-up time, wake-up duration, and wake-up frequency, completing steps (b) and (c) until an end of a monitoring cycle;
computing a baseline carbon layer total carbon stock, including: by multiplying the baseline carbon layer carbon density by the area of each carbon layer patch, obtaining the baseline carbon layer total carbon stock;
monitoring the project IoT, including:
dividing the project carbon layers, including: within the project boundary, dividing the project carbon layers according to project activity types;
monitoring remote sensing change of the project carbon layers, including: conducting a change detection of remote sensing images for two periods, updating the project carbon layer patches and generating the changes of the patches through an interpretation, verification, and validation of the changed patches, obtaining a current status database and change database of the project carbon sinks, and a latest carbon layer patch area for total processing measurement of the project carbon layers, wherein a layout method and process of the project IoT sample plot monitoring are consistent with the baseline IoT sample plot monitoring;
project carbon layer carbon density IoT monitoring, including: designing and deploying the IoT sample plots for the project according to the project carbon layers adjusted by the remote sensing change monitoring, dynamically monitoring the arbor of the forest per unit area, the deadwood per unit area, the litter per unit area in the project carbon layers, and greenhouse gas emissions of the project, and computing the baseline carbon layer carbon density;
computing the project carbon layer total carbon stock, including: by multiplying the project carbon layer carbon density by the area of each carbon layer patch, obtaining the project carbon layer total carbon stock;
monitoring total carbon stock and carbon change in real time, including: computing the total carbon stock for the current monitoring cycle within the project boundary, as well as a carbon change rate per unit time;
determining the end of monitoring and monitoring the automatic period including: running and monitoring periodically according to the set time of the IoT monitoring sample plots; ending the monitoring if the monitoring of the project boundary, baseline, and project activities all ceases and results in withdrawal of the project.

2. The dynamic carbon sink measurement method for afforestation carbon sink and forest management carbon sink projects according to claim 1, characterized in that specific steps in the baseline carbon layer carbon density IoT monitoring are as follows:
designing the baseline sample plots, including: based on a project scope and precision requirements, selecting a sample plot layout scheme, determining a number and size of the baseline sample plots;
monitoring the baseline IoT sample plots, including: according to the designated sample plots, fixing tree diameter measurement sensors at the breast height position of sample trees in baseline sample plots, connecting the tree diameter measurement sensors to the communication gateway so that the sensors can monitor and collect data on the diameter at breast height and a growth status of the sample trees, and transmitting the data back to the server through communication to realize the monitoring of various carbon pools in the plots;
computing the baseline arbor carbon density, including: computing the baseline arbor carbon density by using a biomass expansion factor method;
computing the baseline deadwood carbon density, including: based on the computation results in the computing the baseline arbor carbon density, a "carbon stock change method" combined with a "default value method" is used to compute the baseline deadwood carbon density;

computing the baseline litter carbon density, including: based on the computation results in the computing the baseline arbor carbon density, the "carbon stock change method" combined with the "default value method" is used to compute the baseline litter carbon density;

computing the baseline carbon layer carbon density, including: summing up the carbon stock of biomass, dead wood, and litter of all tree species.

3. The dynamic carbon sink measurement method for afforestation carbon sink and forest management carbon sink projects according to claim 2, characterized in that specific steps in the computing the baseline arbor carbon density are as follows:

according to the data of the sample tree species, the diameter at breast height, and a standing tree type from the sample plots collected in the IoT sample plots in the monitoring the baseline IoT sample plots, a volume of standing trees for each tree species per unit area is computed by using a unified single entry volume table in this area, with diameter as an independent variable and volume as a dependent variable, where a computation formula is as follows:

$$v_{base,i,j,t} = \frac{\sum_{j=1}\sum_{k=1} f_j(d_{k,i,j,t})}{s}$$

where $v_{base,i,j,t}$ is the volume of standing trees per unit area in the baseline for tree species j in the i-th carbon layer at the t-th monitoring; $d_{k,i,j,t}$ is a DBH of k-th sample tree for tree species j in the i-th carbon layer at the t-th monitoring; s is the area of the sample plot; $f_j$ is an empirical equation for the single entry volume of this tree species j; j is the tree species j; k is the k-th sample tree; t is the t-th monitoring; i is the i-th carbon layer;

computing biomass by using the biomass expansion factor method, with volume as the independent variable and biomass as the dependent variable; obtaining three default values for wood density, root-to-crown ratio, and biomass expansion factor from tables, where a computation formula is as follows:

$$w_{base,i,j,t} = v_{base,i,j,t} \times WD_j \times BEF_j \times (1+R_j)$$

where $v_{base,i,j,t}$ is the baseline biomass per unit area for tree species j in the i-th carbon layer at the t-th monitoring; $WD_j$ is the density of standing trees of tree species j; $BEF_j$ is a dimensionless biomass expansion factor that converts a trunk biomass of standing trees of tree species j into aboveground biomass; $R_j$ is the root-to-crown ratio of standing trees of tree species j;

computing carbon stock by using a carbon content of biomass to convert biomass into carbon stock; converting carbon stock to carbon dioxide equivalent by using the ratio of carbon dioxide analysis to a molecular weight of carbon, where a computation formula is as follows:

$$c_{tree\_base,i,j,t} = \frac{44}{12} \times w_{base,i,j,t} \times CF_j$$

where $c_{tree\_base,i,j,t}$ is the baseline arbor carbon density for tree species j in the i-th carbon layer at the t-th monitoring; $CF_j$ is the carbon content of standing trees of tree species j;

where a computation formula in the computing the baseline deadwood carbon density is as follows:

$$c_{dw\_base,i,j,t} = c_{tree\_base,i,j,t} \times DF_j$$

where $c_{dw\_base,i,j,t}$ is the baseline dead wood carbon density for tree species j in the i-th carbon layer at the t-th monitoring; $DF_j$ is the ratio of the baseline dead wood carbon content to the baseline arbor carbon stock for tree species j, which is the default value;

where a computation formula in the computing the baseline litter carbon density is as follows:

$$c_{li\_base,i,j,t} = f_j(w_j) \times c_{tree\_base,i,j,t}$$

where $c_{li\_base,i,j,t}$ is the baseline litter carbon density for tree species j in the i-th carbon layer at the t-th monitoring; $f_j(w_j)$ is a correlational relationship between the baseline litter biomass and the baseline arbor biomass for tree species j, which is the default value;

where a computation formular in the computing the baseline carbon layer carbon density is as follows:

$$c_{base,i,t} = \sum_{j=1}(c_{tree\_base,i,j,t} + c_{dw\_base,i,j,t} + c_{li\_base,i,j,t})$$

where $c_{base,i,t}$ is the baseline carbon layer carbon density in the i-th carbon layer at the t-th monitoring.

4. The dynamic carbon sink measurement method for afforestation carbon sink and forest management carbon sink projects according to claim 3, characterized in that a computation formula in the computing a baseline carbon layer total carbon stock is as follows:

$$c_{base,t} = \sum_{i=1}(c_{base,i,t} \times s_{base,i})$$

where $c_{base,t}$ is the baseline carbon layer total carbon stock at the t-th monitoring; $s_{base,i,t}$ is the area of the baseline carbon layer patches in the i-th carbon layer.

5. The dynamic carbon sink measurement method for afforestation carbon sink and forest management carbon sink projects according to claim 4, characterized in that the specific steps in the monitoring remote sensing change of the project carbon layers are as follows:

after pre-processing the updated remote sensing images, obtaining the patches with changes in land type within the monitoring area; determining the patch numbers, boundary, and area of the changed patches, initially judging a cause of the changes; performing quality check to ensure that there are no overlapping or fragmented patches;

collecting archive materials, using data verification methods to confirm a current land class, reasons for changes, current forest stand factors, management factors, and project activity factors indoors for the changed patches supported by archive materials; for the changed patches without archive materials support, conducting field investigation methods to confirm the current land class, the reasons for changes, current forest stand factors, management factors, and the project activity factors, refining and filling in the investigation factors for patches with inconsistencies in important factors such as land class and the reasons for changes, forming investigation factors and filling in the remote sensing change patch database with correct attribute logic based on the results of indoor and field investigations;

using the remote sensing change patch database to update a graphics and attributes in a previous carbon layer pattern database, performing attribute logic and spatial topology quality check on the updated results to ensure logical correctness and no overlapping, gaps, or multi-component topology errors, using GIS software to recompute the area of each carbon layer patch to create a project carbon layer database of the current state, and obtaining the latest carbon layer patch area used for an overall processing and quantification of project carbon layers;

performing spatial union by using the previous carbon layer patch database and the project carbon layer database of the current state, adding attribute factors such as the reasons for changes, change basis, and change time, improving and filling in attribute factors according to the attribute quality check logic of the change database, creating the project carbon layer change database.

6. The dynamic carbon sink measurement method for afforestation carbon sink and forest management carbon sink projects according to claim 4, characterized in that specific steps in the project carbon layer carbon density IoT monitoring are as follows:

designing the project sample plots: based on the project scope and precision requirements, selecting a project sample plot layout scheme, determining the number and size of the project sample plots, wherein the size of the project sample plots is consistent with that of the baseline sample plots;

monitoring the project IoT sample plots;

computing the project arbor carbon density, including: computing the project arbor carbon density by using the biomass expansion factor method;

computing the project dead wood carbon density, including: based on the computation results in- the computing the project arbor carbon density, using the "carbon stock change method" combined with the "default value method" to compute the project dead wood carbon density;

computing the project litter carbon density, including: based on the computation results in the computing the project arbor carbon density, using the "carbon stock change method" combined with the "default value method" to compute the project litter carbon density;

computing the project greenhouse gas emissions per unit area: the greenhouse gas emissions caused by arbor burning resulting from forest fires within the boundary of comprehensive projects include two parts: arbor and dead organic matter, where a computation formula is as follows:

$$GHG_{current,i,t} = GHG_{tree\_current,i,t} + GHG_{dom\_current,i,t}$$

where $GHG_{current,i,t}$ represents an increase in greenhouse gas emissions in the i-th carbon layer at the t-th monitoring; $GHG_{tree\_current,i,t}$ represents the increase in non-$CO_2$ greenhouse gas emissions caused by arbor burning due to forest fires in the i-th carbon layer at the t-th monitoring; $GHG_{dom\_current,i,t}$ represents the increase in non-$CO_2$ greenhouse gas emissions caused by dead organic matter burning due to forest fires in the i-th carbon layer at the t-th monitoring;

the increase in non-$CO_2$ greenhouse gas emissions caused by arbor burning due to forest fires is computed by using biomass and combustion factors from the previous monitoring, where a computation formula is as follows:

$$GHG_{tree\_current,i,t} = w_{tree\_curent,i,t-1} \times COMF_i \times (EF_{CH_4,i} \times GWP_{CH_4} + EF_{N_2O,i} \times GWP_{N_2O})$$

where $w_{tree\_curent,i,t-1}$ represents the arbor per unit area in the i-th carbon layer at the t−1st monitoring; $COMF_i$ is a combustion index for each vegetation type in the i-th carbon layer, which is a default value; $EF_{CH_4,i}$ is a $CH_4$ emission index in the i-th carbon layer; $GWP_{CH_4}$ is the equivalent that converts $CH_4$ to $CO_2$, defaulting to 25; $EF_{N_2O,i}$ is a $N_2O$ emission index in the i-th carbon layer; $GWP_{N_2O}$ is the equivalent that converts $N_2O$ to $CO_2$, defaulting to 298;

$$GHG_{dom\_current,i,t} = 0.07 \times (c_{dw\_curent,i,t-1} + c_{li\_curent,i,t-1})$$

where $c_{dw\_curent,i,t-1}$ is the dead wood biomass per unit area in the i-th carbon layer at the t−1st monitoring; $c_{li\_curent,i,t-1}$ is the litter biomass per unit area in the i-th carbon layer at the t−1st monitoring;

computing the project carbon layer carbon density: the project carbon layer carbon density is the sum of the arbor carbon stock, the dead wood carbon stock, and the litter carbon stock for all tree species minus greenhouse gas emissions, where a computation formula is as follows:

$$c_{current,i,t} = \sum_{j=1}(c_{tree\_current,i,j,t} + c_{dw\_current,i,j,t} + c_{li\_current,i,j,t}) - GHG_{current,i,t}$$

where $c_{current,i,t}$ is the project carbon layer carbon density in the i-th carbon layer at the t-th monitoring; $c_{base,i,t}$ is the baseline carbon layer carbon density in the i-th carbon layer at the t-th monitoring.

7. The dynamic carbon sink measurement method for afforestation carbon sink and forest management carbon sink projects according to claim 6, characterized in that a computation formula in the computing the project carbon layer total carbon stock is as follows:

$$c_{current,t} = \sum_{i=1}(c_{current,i,t} \times s_{current,i})$$

where $c_{current,t}$ represents the project carbon layer total carbon stock at the t-th monitoring; $s_{current,i,t}$ represents the area of the project carbon layer patches in the i-th carbon layer.

8. The dynamic carbon sink measurement method for afforestation carbon sink and forest management carbon sink projects according to claim 7, characterized in that the total carbon stock in the monitoring total carbon stock and carbon change in real time is a difference between the project carbon layer total carbon stock and the baseline carbon layer carbon stock, where a computation formula is as follows:

$$c_t = c_{current,t} - c_{base,t}$$

where $c_t$ represents the total carbon stock at the t-th monitoring;

carbon change is the change in carbon stock over a certain monitoring period, computed as follows:

$$\Delta c_{t_2,t_1} = \frac{c_{t_2} - c_{t_1}}{t_2 - t_1} \qquad 5$$

where $\Delta c_{t2,t1}$ is the change in carbon stock from the $t_1$-th monitoring to the $t_2$-th monitoring; $c_{t2}$ is the total carbon stock at the $t_2$-th monitoring; $c_{t1}$ is the total carbon stock at the t-th monitoring; $t_2$ and $t_1$ represent the monitoring period, which is set based on the IoT monitoring sample plots.

\* \* \* \* \*